UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLUE-BLACK SULFUR DYE.

SPECIFICATION forming part of Letters Patent No. 648,753, dated May 1, 1900.

Application filed February 6, 1900. Serial No. 4,262. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in Blue-Black Dyestuffs, of which the following is a specification.

My invention relates to the manufacture of a blue-black coloring-matter which directly dyes unmordanted cotton. It can be obtained from a certain meta-phenylendiamin derivative by treating the same with sulfur and sodium sulfid. The said meta-phenylendiamin derivative results from the condensation of symmetrical dinitro-meta-dichlorbenzene with para-amido-salicylic acid in aqueous solution and in the presence of a body that will bind the hydrochloric acid formed during the reaction, such as sodium carbonate or acetate. In this way dinitro-di-para-hydroxy-diphenyl-meta-phenylendiamin-di-carboxylic acid is obtained, which, judging from the manner of its formation, has the following constitutional formula:

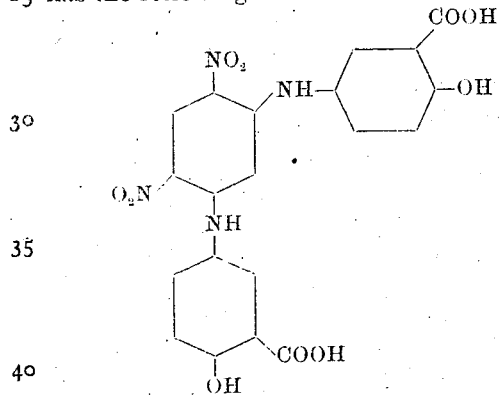

and this when treated in the manner to be described with sulfur and sodium sulfid yields the coloring-matter which I desire to claim.

The following example will serve to further illustrate the manner in which my invention may be carried into practical effect and my new coloring-matter obtained. The parts are by weight.

*Production of a blue-black coloring-matter from dinitro-di-para-hydroxy-di-phenyl-meta-phenylendiamin-di-carboxylic acid.—* Prepare the required initial material by heating to boiling in a reflux apparatus a mixture of one molecular proportion of dinitro-dichlorbenzene, two molecular proportions of para-amido-salicylic acid sodium salt, the latter dissolved in water, and sufficient sodium acetate to bind the hydrochloric acid formed during the reaction. Continue the heating until the dinitro-di-chlorbenzene has practically disappeared. Allow the liquid to cool and isolate the reaction product in any well-known manner. Mix together twenty (20) parts of the dinitro-di-para-hydroxy-di-phenyl-meta-phenylendiamin-di-carboxylic acid thus obtained with forty (40) parts of sulfur, one hundred and twenty (120) parts of crystallized sodium sulfid, and five (5) parts of water in an iron vessel. Gradually heat the mixture to about 140° centigrade while stirring and maintain at this temperature until the melt has become quite dry. When cool, powder it up. In this condition it can be directly used for dyeing purposes, or it may be dissolved in a little water and salted out with common salt. In this case when dyeing it is necessary to add soda, common salt, and sodium sulfid to the dyeing-bath in order to obtain the best results.

My new coloring-matter is readily soluble in water, its aqueous solution being blue green. Acids added to the solution produce a brown precipitate, which is redissolved by alkalies with a blue-green color. It dyes unmordanted cotton a blue black which is exceedingly fast to the action of soap, light, and acids. It is but little altered in fastness or shade by subsequent treatment with chromates, copper-salts, and the like.

Now what I claim is—

The new coloring-matter, which can be obtained from dinitro-di-para-hydroxy-diphenyl-meta-phenylendiamin-di-carboxylic acid, by treating the same with sulfur and sodium sulfid, whose solution in water is of a blue-green color dyeing unmordanted cotton a blue black, which is not materially altered in shade or fastness by treatment with chromates and copper-salts, and in which solution a brown precipitate is formed on the addition of hydrochloric acid, the said precipitate redissolving in alkalies with a blue-green color, substantially as described.

In testimony whereof I have hereunto set my hand in the presence of two subscribing witnesses.

PAUL JULIUS.

Witnesses:
JACOB ADRIAN,
ERNEST F. EHRHARDT.